Patented Mar. 20, 1923.

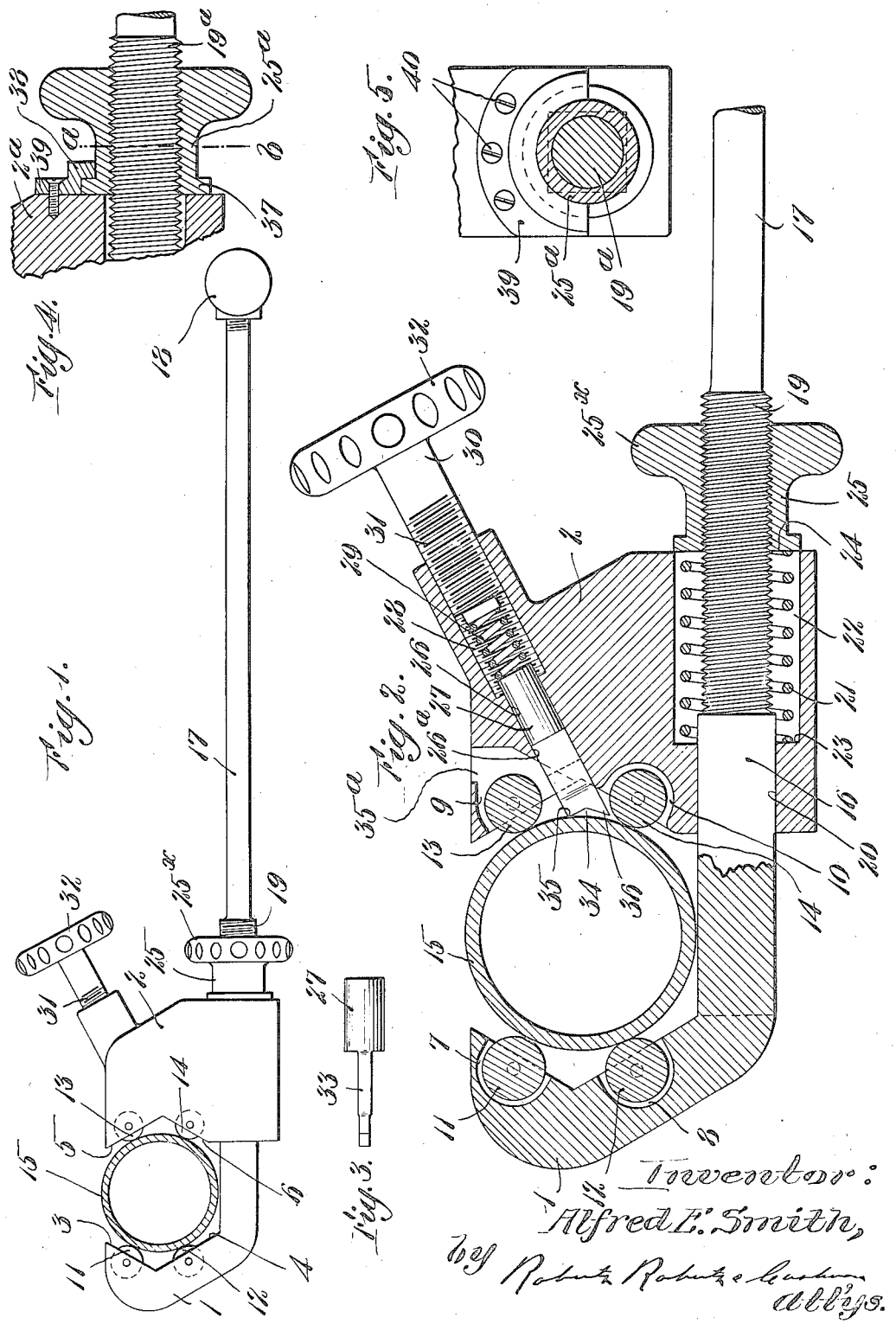

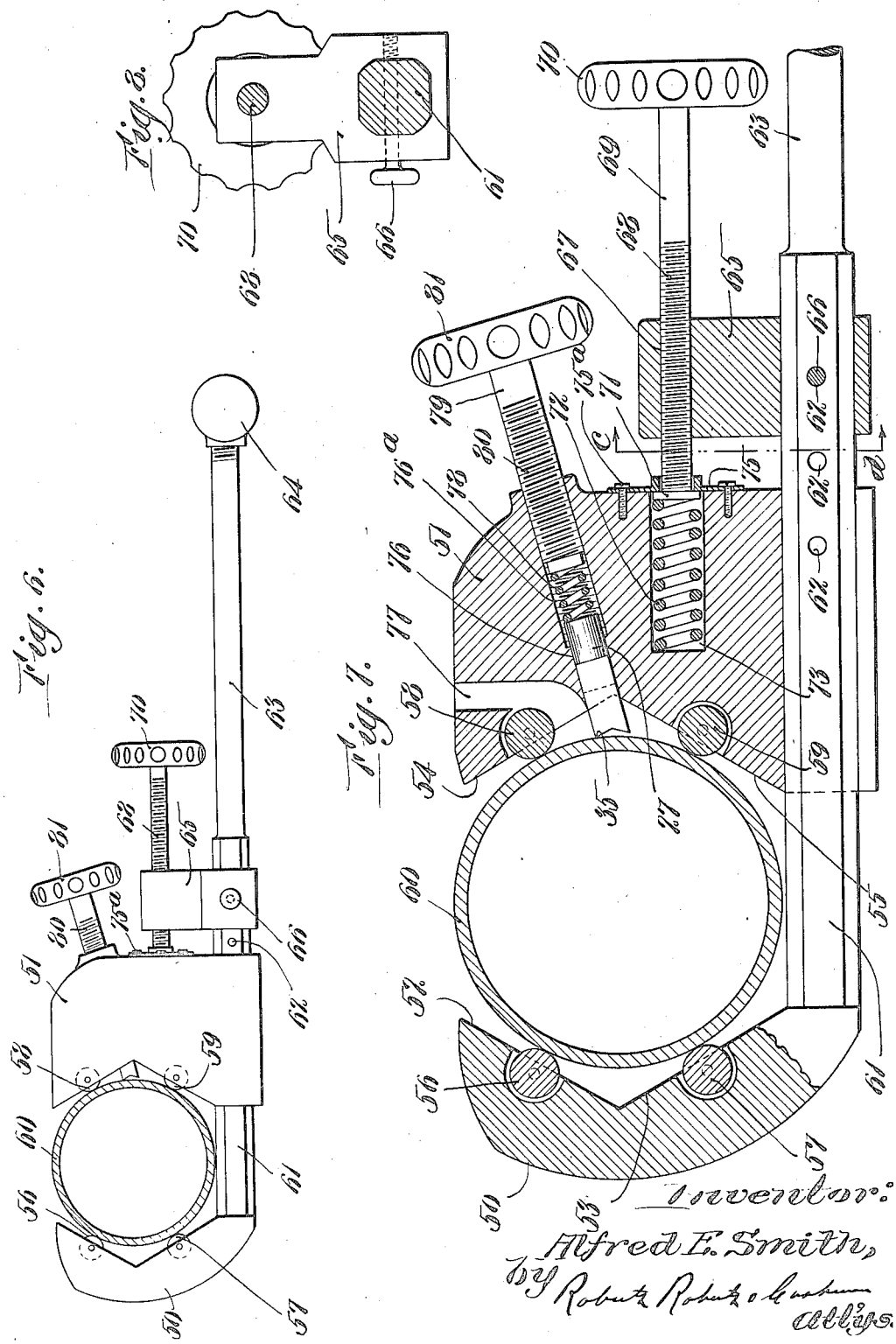

1,448,877

UNITED STATES PATENT OFFICE.

ALFRED E. SMITH, OF WINTHROP, MASSACHUSETTS.

PIPE AND ROD CUTTER.

Application filed February 24, 1922. Serial No. 538,841.

*To all whom it may concern:*

Be it known that I, ALFRED E. SMITH, citizen of the United States of America, and resident of Winthrop, in the county of Suffolk and State of Massachusetts, have invented new and useful Improvements in Pipe and Rod Cutters, of which the following is a specification.

This invention concerns devices for cutting pipe or rods and relates more particularly to manually operable devices of the kind which, in use, are rotated about the axis of the pipe or rods for performing the severing operation.

Hand operated devices for cutting pipe commonly comprise a pair of relatively movable jaws between which the pipe to be severed is held, a handle whereby the device may be swung bodily about the pipe as an axis, and a cutter adjustably secured to one or both of the jaws, such cutter or cutters being forced inwardly against the pipe and serving to sever the latter as the device is rotated. As it is necessary in order properly to present the cutter against the work and to guide it in a predetermined path, that the pipe be clamped firmly between the jaws, the operation of cutting pipes in this manner is exceedingly laborious. Certain attempts have been made heretofore to reduce the labor involved in the employment of such devices, as for example by providing anti-friction rolls in the bearing faces of one or both of the clamping jaws, or by providing a spring abutment for the cutter so that the latter is enabled to give back more or less if the resistance to cutting becomes too great. While such expedients may be effective to a limited extent in reducing the labor of operating cutting devices of this character, the real source of difficulty appears to have been overlooked entirely and thus no adequate remedy has been supplied. If all commercial pipe were of exact circular cross section, the above-described improvements might perhaps fulfill all requirements, but this is not the case. In fact it is very seldom that ordinary pipe is of exact circular cross section, the eccentricity of such pipe being in many cases so marked as readily to be noticeable by the eye. It is thus obvious that if the jaws of the cutting device be set up firmly against such an eccentric piece of pipe, even though there be a certain degree of back-lash between the jaws, it is necessary, in swinging the device about the pipe, either actually to compress the latter into circular form or to scrape or turn off metal from the protruding portions of the exterior surface of the pipe as the jaws move thereover.

In some types of cutting devices the cutter is secured to the outer side of one or the other of the jaws so that the entire width of the jaw lies to one side of the cutter. This makes it difficult to maintain the cutting edge of the tool directly parallel to the axis of the work, while the necessary width of the jaw at one side of the cut causes the pipe to be marred for a very considerable distance from such cut. This is highly objectionable when working on brass pipe, the surface of which must be kept smooth and undamaged so that cutters of the above character find little favor among workers in this material.

In cutting cast iron pipe it is usual to nick the pipe circumferentially with a cold chisel whereby to permit it to be broken at the desired point, but this consumes much time and results in a very rough and uneven end. The cutting of solid rods or bars is usually performed by the use of a hack saw, or by means of a cutting-off tool in a lathe. The first method results in the production of an uneven end which must afterward be finished, while a lathe of proper dimensions is not always available for carrying out the latter method, and in any case cutting by means of a lathe requires careful supervision on the part of the workman.

The principal object of the present invention is to provide a pipe cutting device of a character such that, regardless of eccentricity in the pipe, the cutting of the latter may be accomplished easily and with a minimum expenditure of labor.

A further object is to provide a cutting implement of a character such that it may successfully be employed for cutting cast iron pipe and also for severing solid rods or bars, the cutting of the latter being accomplished either with or without the assistance of a lathe.

A further object is to provide a cutting device of such a character that the cut shall be formed substantially midway between the sides of the jaws, and having jaws of such a width that if any marring of the pipe is occasioned by the action of such jaws, the marred area will not extend beyond that portion of the pipe which will thereafter be screw-threaded.

A still further object is to provide a cutting device of simple character; having provision for a rapid adjustment of the clamping jaws; capable of use for cutting pipes or rods of widely different dimensions; and which at the same time is light in weight but substantial, relatively cheap to construct, accurate in operation, and of pleasing appearance.

In the accompanying drawings there is illustrated by way of example means whereby these objects may well be attained, and in such drawings,—

Fig. 1 is a side elevation of a device constructed in accordance with the present invention, such device being particularly adapted for use in cutting pipe of the smaller diameters;

Fig. 2 is a fragmentary vertical cross section through the device of Fig. 1, but to larger scale;

Fig. 3 is a top plan view of a cutter suitable for use with the device of Figs. 1 and 2;

Fig. 4 is a fragmentary vertical cross section illustrating a modification of the device of Fig. 1;

Fig. 5 is a fragmentary cross section on the line $a$—$b$ of Fig. 5;

Fig. 6 is a side elevation of a cutting device in accordance with the present invention, but of slightly modified form and particularly intended for use in cutting pipe of large diameter;

Fig. 7 is a fragmentary vertical cross section of the device of Fig. 6, but to larger scale; and Fig. 8 is a cross section on the line $c$—$d$ of Fig. 7.

Referring to Figs. 1, 2 and 3, the cutting device is illustrated as comprising the relatively movable jaws 1, 2 respectively. While in the operation of this device either or both of such jaws may be moved in clamping the device upon a piece of pipe, the jaw 1 is hereinafter referred to for convenience in description as the fixed jaw and the jaw 2 as the movable jaw. The jaw 1 is provided with angularly disposed faces 3, 4, while the jaw 2 is provided with similar faces 5, 6. The faces 3, 4, of the jaw 1 are furnished with recesses 7, 8, respectively while the faces 5, 6 of the jaw 2 are provided with similar recesses 9, 10. Within the respective recesses, anti-friction rollers 11, 12, 13, 14 are suitably mounted, such rollers constituting the engaging elements of the jaws between which a pipe 15 may be clamped. These rollers if desired may extend continuously across the width of the jaw faces or may be provided with grooves at their central portions and in the plane of the cut, in order to permit the free passage of chips or burrs which may project from the edges of the cut.

The fixed jaw is provided with an elongate stem fixedly secured thereto and herein shown as integral therewith. This stem comprises the guide portion 16, preferably of angular cross section, and the portion 17 which may be provided at its extremity with a hand grip 18, such portion 17 with its grip constituting a handle for actuating the device. At a point intermediate the guide 16 and the handle 17 the stem is externally screw threaded as at 19. The movable jaw 2 is provided at a point substantially midway of its width, with a guide opening at 20 for the reception of the portion 16 of the stem of a fixed jaw, the movable jaw sliding upon such guide portion 16 of the stem. This opening is enlarged at 21 to provide a chamber within which is received a compression spring 22. One end of this compression spring bears against the inner end wall 23 of the chamber, while at its outer end the spring bears against the inner end surface 24 of a nut 25 which is internally screw threaded for engagement with the threaded portion 19 of the stem. This nut is furnished with a hand wheel $25^x$, whereby it may be turned for placing the spring 22 under compression.

The movable jaw is also provided with an opening extending entirely therethrough, such opening comprising the portion 26 of circular cross section and the rectangular portion or slot $26^a$, the latter opening adjacent to the intersection of the jaw faces 5 and 6. Within the circular portion of this opening is slidably arranged the rear, cylindrical part 27 of a cutter. Against the end of the part 27 bears a coil spring 28, seated within a chamber 29 forming an enlargement of the aforesaid opening. The opposite end of the spring 28 engages the inner end of a rod 30, which is screw threaded at 31 for engagement with screw threads on the interior of the chamber 29. This rod 30 is provided with a hand wheel 32, whereby it may be turned for compressing the spring.

The outer end of the cutter is of generally rectangular cross section as indicated at 33 and is notched at its extremity as shown at 34 to provide spaced cusps 35, 36. The edge of the cusp 35 constitutes the cutting element, while the cusp 36 serves as a guard device whereby to limit the depth of cut. A chip escape passage $35^a$ is also provided in the jaw 2, such passage diverging from the slot $26^a$ in such a manner that chips turned up by the cutting edge at 35 tend to pass outwardly through each opening.

In the operation of this device the hand wheel $25^x$ having first been reversely rotated to relieve the spring 22 from compression, the jaws may be opened sufficiently for the reception of a piece of pipe such as 15. The hand wheel 25× is then turned to place the spring under the desired compression necessary for properly retaining the device upon the pipe during the cutting operation. The hand wheel 32 is then manipulated to compress the spring 28, thus forcing the cutter toward the work to the desired extent. The entire device is then swung bodily about the pipe by means of a handle 17 whereby the cutter is caused to remove a chip from the peripheral surface of the pipe. As will be noted, the cutter is of that type which actually removes metal from the pipe instead of merely displacing the metal laterally, so that the resistance to cutting may be very accurately determined by the adjustment of the hand wheel 32. If the pipe which is being cut be eccentric, it is evident that by the provision of the spring abutment between the jaws, such jaws may move toward or from each other to the necessary extent to permit the ready rotation of the device about the pipe, while at the same time the jaws are held against the pipe with the sufficient pressure to ensure the proper cutting action of the tool and the maintenance of the tool in the desired plane of cut.

The arrangement shown in Figs. 4 and 5 may be found useful under certain circumstances, but is not of a preferred character. In these figures the movable jaw is indicated at 2ª and the threaded portion of the guide stem at 19ª. Engaging such threaded portion is the nut 25ª provided in this instance with a radial flange 37 which lies beneath a segmental flange 38 projecting from a collar 39 secured to the movable jaw by means of screws 40. In this case the spring abutment is entirely omitted, the nut 25ª serving to provide for positive relative adjustment of the two jaws.

The device shown in Figs. 6, 7 and 8 is particularly intended for use in cutting pipe of large diameter. This device is of generally similar form to that shown in Figs. 1, 2 and 3 and comprises the fixed jaw 50, and the movable jaw 51, such jaws being provided with angularly disposed faces 52, 53; 54, 55 respectively. These faces are furnished with anti-friction rolls 56, 57; 58 and 59, respectively, in the same manner as described with respect to the device of Figs. 1 and 2. These rolls serve as the engaging elements whereby a pipe 60 may be clamped between the jaws. It will be noted both as respects the device shown in Figs. 6 and 7 and that of Figs. 1 and 2 that the two rolls of each jaw are spaced apart in such manner as to lie upon opposite sides of that diameter of the pipe which extends through the cutting point. The pressure upon the pipe is thus distributed in a uniform fashion so that the pipe is firmly and positively held with no tendency to spring outwardly from between the jaws.

In the device shown in Figs. 6 and 7 the fixed jaw 50 is provided with a stem having the guiding portion 61 of substantially rectangular cross section, such guiding portion being furnished with a plurality of spaced openings 62 therethrough. This stem also comprises the handle portion 63 furnished at its extremity if desired with a hand grip 64. Upon the guide portion 61 is slidably mounted a block 65, such block being provided with a transverse opening for the reception of a pin 66 whereby such block may be adjustably secured to the stem, the pin 66 being passed through one of the openings 62 for this purpose. The block 65 is also provided with an internally screw threaded opening 67 with which engages the opposite threaded portion 68 of a rod 69 having a hand wheel 70 at its extremity whereby it may be turned. At its opposite extremity, this rod is provided with a head 71, which engages one end of a compression spring 72 seated within a bore 73 in the jaw 71, such bore aligning with the axis of the rod 69. For retaining the parts in proper position a cover plate 75 may be provided, such cover plate being secured to the jaw 51 by means of screws 75ª.

Extending outwardly from the faces 54, 55 of the jaw 51 and at a point substantially central of the width of the jaw, are divergent openings 76, 77, the first of these openings comprising a portion of circular cross section forming a guide for the cylindrical part 27 of a cutter, such as previously described, such opening also comprising a slot of rectangular cross section for guidance of the reducing portion 33 of such a cutter. The other of the divergent openings 77 constitutes a chip escape passage, such opening extending from a point adjacent to the cutting edge 35 of the cutter. The opening 76 at its outer part is enlarged to form a chamber 76ª, such chamber being internally screw-threaded. Within this chamber is arranged a compression 78 bearing at one end against the cutter and at its opposite end against the inner extremity of a rod 79, such rod being screw-threaded at 80 for engagement with the screw threads upon the inner wall of the chamber 76ª and being provided at its outer end with a hand wheel 81 whereby it may be rotated.

In the operation of this device, the block 65ª is first roughly adjusted along the guide member 61 in accordance with the general diameter of the pipe to be severed, such adjustment being accomplished by removing the pin 66, sliding the block to the desired position and then inserting the pin 66 through the opening in the block and through a selected one of the openings 62 in the guide stem 61. After this coarse adjustment has been accomplished, the hand wheel 70 is manipulated to secure the fine adjustment desired for setting the jaws firmly against the pipe. Such rotation of the hand wheel 70 serves to compress the spring 72 so that the relative movement of the two clamping jaws in the final clamping action results from the compression of this spring, the jaws then being resiliently pressed together. The operation of setting the cutter against the work by means of the hand wheel 81 is like that previously described with respect to the device of Figs. 1 and 2. As the cutting device is swung about the pipe, the cutter serves to remove chips therefrom which pass out through the opening 77, and at each revolution of the cutting device about the pipe, the cutter may be moved inwardly by means of the hand wheel 81 whereby to increase the depth of cut to the desired extent.

It will be noted with respect to the devices herein disclosed that not only are the jaws provided with friction rollers for relieving friction between the same and the pipe and that the cutter is resiliently thrust toward the pipe, but that the jaws are also resiliently urged toward each other so that by the combined action of these various elements it is possible to swing the cutting device about the pipe with the expenditure of but a slight effort as compared with devices commonly employed. The arrangement is of simple character, the adjusting wheels in both instances being arranged in close proximity to each other so that either adjustment can be accomplished with a minimum of effort. It is to be noted that the handle by means of which the device is swung about the pipe is fixed relatively to one of the jaws and that no turning of such handle upon its axis is necessary for setting up the jaws or for causing engagement of the cutter with the work. The cutter employed is of simple character and may readily be replaced when worn or dulled, while the provision of the guard device upon the cutter serves in an effective manner to prevent the user from pressing the cutter against the pipe, to an excessive extent.

When employed for cutting solid rods or bars the operation is the same as in cutting pipe, the cutter being made somewhat longer, if necessary, in order to permit it to extend substantially to the axis of the rod or bar in making the cut. If a lathe be available, the rod may be placed therein and the present device employed for making the cut. In the latter case the device is held stationary by engagement with the tool rest, and by suitably tensioning the cutter spring at the beginning of the operation, the feeding of the cutter toward the work may be made automatic so that no especial care is necessary in performing the operation. In either case the rod or bar is severed smoothly and in a plane exactly perpendicular to its axis, avoiding any waste of material, or the necessity for a subsequent finishing operation. The tool as thus devised is particularly useful in repair shops and in electrical work where its compactness and wide capability of function permit of its effective substitution for many of the devices at present employed.

While a specific arrangement of parts has herein been disclosed it is to be understood that various changes and modifications might well be made therein without departing from the spirit of the invention. In particular it is to be understood that while a specific form of cutter has been disclosed herein, the invention in its broadest aspects is in no way dependent upon the employment of such a cutter, but that cutters of other types may well be substituted therefor without sacrificing many of the advantages accruing from the use of the device as a whole.

What I claim and desire to secure by Letters Patent of the United States is:

1. A cutting device comprising relatively movable clamping jaws, spring means normally urging said jaws toward one another, means for adjusting the tension of said spring, an adjustable cutter carried by one of said jaws, and an adjustable resilient abutment for the cutter carried by said latter jaw.

2. A cutting device comprising relatively movable clamping jaws, a coil spring reacting upon the respective jaws whereby to urge toward one another, screw threaded means for adjusting said spring, a spring pressed cutter carried by one of the jaws, and means movable with said latter jaw for adjusting the tension of the cutter spring.

3. A cutter comprising a fixed jaw, a movable jaw, a cutting tool, means for imparting a coarse adjustment to the movable jaw relatively to the fixed jaw, means for imparting a fine adjustment to said movable jaw including a resilient element, and means for adjustably tensioning such element, and a spring pressed cutter carried by one of said jaws.

4. A cutting device comprising a fixed jaw, a movable jaw, a cutting tool, a rotatable screw threaded element for imparting a fine adjustment to said movable jaw, a member having threaded engagement with said threaded element, means whereby coarse adjustment may be imparted to said member as respects the fixed jaw, and a spring pressed cutter carried by one of said jaws.

5. A cutter comprising a fixed jaw having an elongate guide stem projecting therefrom, a movable jaw slidably guided by said stem, a block mounted upon said stem and having an internally screw threaded opening, a threaded rod engaging the threads of said opening, means whereby the rod may be rotated, a coil spring reacting at its opposite ends against the movable jaw and the threaded rod, respectively, a cutter sliding in a bore in one of said jaws, and resilient means forming an abutment for said cutter.

6. A pipe cutting device comprising a fixed jaw having a guide stem projecting therefrom, a movable jaw slidably guided by said stem, a block slidably supported upon the stem, means for adjustably securing said block in selected position upon said stem, resilient abutment means interposed between said block and the movable jaw, and a resiliently adjustable cutter mounted in a bore in said movable jaw.

7. A pipe cutting device comprising a fixed jaw having a guide stem projecting therefrom, said guide stem constituting an actuating handle, a movable jaw slidably guided by said stem, said stem having spaced openings therein, a block slidably adjustable upon said stem, a pin engageable with a selected one of said openings for securing the block in adjusted position, adjustable resilient means interposed between the block and the movable jaw, a cutter seated in a bore in said movable jaw, and an adjustable spring forming an abutment for said cutter.

8. A pipe cutter comprising a fixed jaw, an elongate guide stem fixedly secured to said jaw, a movable jaw slidably engaging said guide stem, a hand grip upon the outer extremity of said stem, a rotatable hand wheel for adjusting the movable jaw relatively to the fixed jaw, and spring means for transmitting movement from the hand wheel to the movable jaw.

9. A pipe cutter comprising a fixed jaw having an actuating handle fixedly secured thereto, a movable jaw, a rotatable hand wheel adjacent to said handle, a spring engaging said movable jaw, means operable by rotation of the hand wheel for compressing said spring, and a cutter mounted upon the movable jaw.

10. A pipe cutter comprising a fixed jaw and a movable jaw, each of said jaws having angularly disposed faces, an antifriction roller projecting from each of said faces whereby properly to center the work therebetween, a resiliently adjustable cutter carried by the movable jaw, said cutter being arranged at a point intermediate the sides of said jaw, and resilient means for urging said jaws toward one another.

11. A pipe cutter comprising a pair of relatively movable jaws, antifriction means for engaging work positioned between said jaws, a cutter slidably guided within an opening in one of said jaws, said cutter being positioned at a point intermediate the sides of said jaw, adjustable spring means for urging said cutter toward the work, and spring means for urging said jaws toward one another.

12. A pipe cutter comprising relatively movable jaws, antifriction rolls carried by the respective jaws for positioning work therebetween, a cutter slidably guided in an opening in one of said jaws, a spring engaging said cutter, screw threaded means for compressing said spring, a hand wheel for actuating said threaded means, a spring for urging the movable jaw toward the fixed jaw, threaded means for compressing said latter spring, and a hand wheel for actuating said last named threaded means, said hand wheels being adjacent to one another.

13. A pipe cutting device comprising relatively movable work clamping jaws, one of said jaws having a chip passage therethrough, and a guide opening therein, and a spring pressed cutter slidably adjustable within said opening and having its cutting edge adjacent to the inner end of the chip passage, said cutter having an integral guard element spaced from its cutting edge whereby to regulate the depth of cut.

14. A pipe cutting device comprising relatively movable work clamping jaws, one of said jaws having outwardly divergent openings therethrough, a cutter having a portion of circular cross section slidable in one of said openings, the other opening constituting a chip channel, the operative end of the cutter being flattened in the plane of the cut and comprising a cutting edge and a depth guide, and means for resiliently adjusting said cutter.

15. In combination in a pipe cutting device having relatively movable clamping jaws, a cutter carried by one of said jaws and movable relative thereto, said cutter having a rear portion of circular cross section and having a rectangular operative portion, the free extremity of said rectangular portion being provided with a notch, thereby providing spaced cusps, one of said cusps constituting a cutting element, and the other of such cusps acting as a depth guard.

Signed by me at Boston, Massachusetts, this 28th day of January, 1922.

ALFRED E. SMITH.